United States Patent
Groen et al.

(10) Patent No.: US 6,888,936 B1
(45) Date of Patent: May 3, 2005

(54) USER CONTROLLED LOCATION SHARING DURING A COMMUNICATION

(75) Inventors: Pieter Groen, Narrden (NL); Paul M. Brennan, Toronto (CA); Anne Grosman, Willowdale (CA); Robert A. Williamson, Aurora (CA)

(73) Assignee: Nortel Networks Limited, St. Laurent (CA)

( * ) Notice: Subject to any disclaimer, the term of this patent is extended or adjusted under 35 U.S.C. 154(b) by 516 days.

(21) Appl. No.: 09/667,667

(22) Filed: Sep. 22, 2000

(51) Int. Cl.⁷ .............................................. H04M 3/42
(52) U.S. Cl. ................. 379/207.12; 379/142.1
(58) Field of Search .................. 379/88.17, 93.23, 379/142.1, 201.06, 201.08, 207.12, 207.15, 211.02, 900, 913

(56) References Cited

U.S. PATENT DOCUMENTS

| | | | |
|---|---|---|---|
| 4,954,958 A | * | 9/1990 | Savage et al. .............. 701/202 |
| 5,109,399 A | | 4/1992 | Thompson .................. 379/45 |
| 5,263,084 A | | 11/1993 | Chaput et al. .............. 379/215 |
| 5,479,482 A | * | 12/1995 | Grimes .................... 455/556.1 |
| 5,625,668 A | * | 4/1997 | Loomis et al. ........... 455/456.5 |
| 5,727,057 A | * | 3/1998 | Emery et al. .......... 379/201.07 |
| 5,805,587 A | * | 9/1998 | Norris et al. ............... 370/352 |
| 6,021,371 A | * | 2/2000 | Fultz ........................ 701/200 |
| 6,101,246 A | * | 8/2000 | Heinmiller et al. .... 379/142.01 |
| 6,185,290 B1 | * | 2/2001 | Shaffer et al. ......... 379/220.01 |
| 6,185,426 B1 | * | 2/2001 | Alperovich et al. ..... 455/456.1 |
| 6,292,479 B1 | * | 9/2001 | Bartholomew et al. ..... 370/352 |
| 6,459,782 B1 | * | 10/2002 | Bedrosian et al. ..... 379/201.08 |
| 6,487,495 B1 | * | 11/2002 | Gale et al. .................. 701/209 |
| 6,674,849 B1 | * | 1/2004 | Froeberg ............... 379/201.06 |

OTHER PUBLICATIONS

GARMIN Corporation, "NavTalk™ Reach Out and Find Someone", 2000, p. 1–2.
General Motors—Driving Tech Lab (OnStar), Onstar Display, Aug. 29, 2000, p. 1., <http://www.gmconfigurator.com/company/sponsored_by_gm/test_track/onsta.htm>.

* cited by examiner

*Primary Examiner*—Bing Q. Bui
(74) *Attorney, Agent, or Firm*—Paul C. Hashim

(57) ABSTRACT

During a telephone call, a party to the call may signal (by, for example, sending certain DTMF tones (a wish to provide his or her location to the other party to the call. The central office responds to this request by accessing a subscriber record for the communication line (e.g., subscriber loop) terminating at the requesting party and sending location information in the subscriber record to the other party to the call. Depending upon the technology available, the location information may be supplied in-band or on a parallel datapath.

18 Claims, 6 Drawing Sheets

USER CONTROLLED LOCATION SHARING DURING A COMMUNICATION

BACKGROUND OF THE INVENTION

This invention relates to a method, system, and computer readable medium for delivering information on the location of a party to a call.

During the course of a telephone call, it may be that one party to the call wishes to convey his or her location to the other party. This could occur where, for example, a caller wished to order delivery of a product from the called party. Unfortunately, errors may be introduced in an address as a called party attempts to take down an address given by a caller and this could delay or derail product delivery. Additionally, where a caller was lost but able to get to a phone, the caller will not known his or her location but nevertheless wish to convey the location to another. Emergency service agencies (such as those reached by dialling 9-1-1) will typically have access to location information of a caller but such agencies are restricted to the provision of emergency services.

General Motors Corporation, under the trademark ONSTAR, has established a roadside emergency services system. Vehicles are provided with a global positioning system (GPS) receiver and a telecommunications device. A vehicle operator may press a button on the telecommunications device to establish a call to a customer service centre. The customer service centre also receives information from the GPS receiver as to the vehicle's location. While useful, the ONSTAR system is restricted to use by subscribers who are properly equipped. Further, there are limits on the services provided by the ONSTAR™ customer service centre.

Accordingly, a need remains for a party to a call to be able to provide location information to another party to the call.

SUMMARY OF THE INVENTION

During a telephone call, a party to the call may signal (by, for example, sending certain DTMF tones) a wish to provide his or her location to the other party to the call. The central office responds to this signal by accessing a subscriber record for the communication link (e.g., subscriber loop) terminating at the signalling party and sending location information in the subscriber record to the other party to the call.

Depending upon the technology available, the location information may be supplied in-band or on a parallel datapath.

According to the present invention, there is provided a method for delivering call party location information, comprising: during pendency of a call between a first communication device and a second communication device, receiving a location information sharing request from said first communication device; accessing a database providing location information for a plurality of communication devices and retrieving location information for said first communication device from said database; forwarding said retrieved location information for said first communications device.

According to another aspect of this invention, there is provided a method for delivering call party location information, comprising: during pendency of a call between a first telephone and a second telephone, receiving location information for said first telephone, said location information comprising information for use by a data terminal; accessing from a database a record relating to said second telephone and retrieving contact information for said data terminal; and sending said location information for use by said data terminal to said data terminal using said contact information.

Systems and computer media are also provided for implementation of these methods.

According to yet another aspect, there is provided a computer data signal embodied in a carrier wave comprising: an indicator of a destination telephone; an indicator of a street address of a source telephone; information for use by a data terminal.

Other aspects and features of the present invention will become apparent to those ordinarily skilled in the art upon review of the following description of specific embodiments of the invention in conjunction with accompanying figures.

BRIEF DESCRIPTION OF THE DRAWINGS

In the figures which illustrate example embodiments of the invention.

DETAILED DESCRIPTION OF THE PREFERRED EMBODIMENTS

Figure 1:
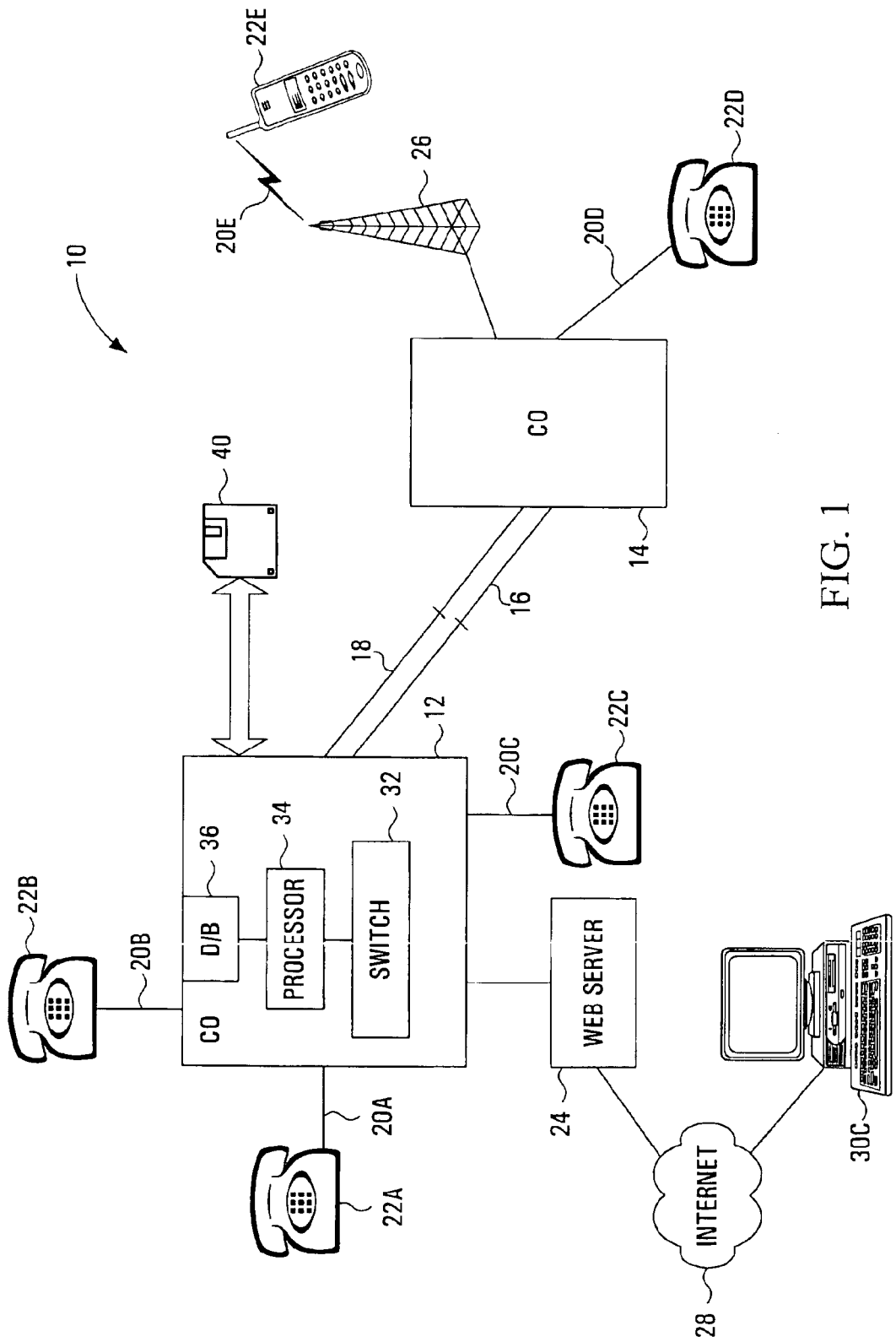
FIG. 1 is a schematic illustration of a telephony system made in accordance with this invention.

Turning to FIG. 1, a telephony system indicated generally at 10 comprises a central office (CO) 12 and a CO 14 interconnected by signal paths 16 and datapaths 18. Each CO has a number of subscriber loops (wireline communications links) 20a, 20b, 20c, 20d terminated by a communications device, namely a telephone 22a, 22b, 22c, 22d. CO 14 also connects to a mobile base station 26 which has a wireless communications link 20e to a mobile telephone 22e. CO 12 is illustrated also connected to a web server 24. Web server 24 connects to a public Internet 28. A data terminal 30c associated with telephone 22c is also connected to Internet 28.

Each CO has a switch 32 connected to a processor 34 which is, in turn, connected to a database 36. A suitable switch/processor/database combination is a DMS™ switch manufactured by Nortel Networks. Processor 34 is capable of reading computer media 40, which may be a diskette, a CD-ROM, a file downloaded from a remote source, or other computer media sufficient to transfer software and data to processor 34. Database 36 stores a subscriber record for each subscriber loop supported by the CO. The subscriber record includes the name, telephone number and location information for the subscriber associated with the loop. The location information includes the subscriber address and, optionally, the nearest intersection to the subscriber address. In one embodiment, the location information also includes a universal resource locator (URL). In this embodiment, the subscriber record may also include the Internet Protocol (IP) address for a data terminal associated with the subscriber.

Figure 2:
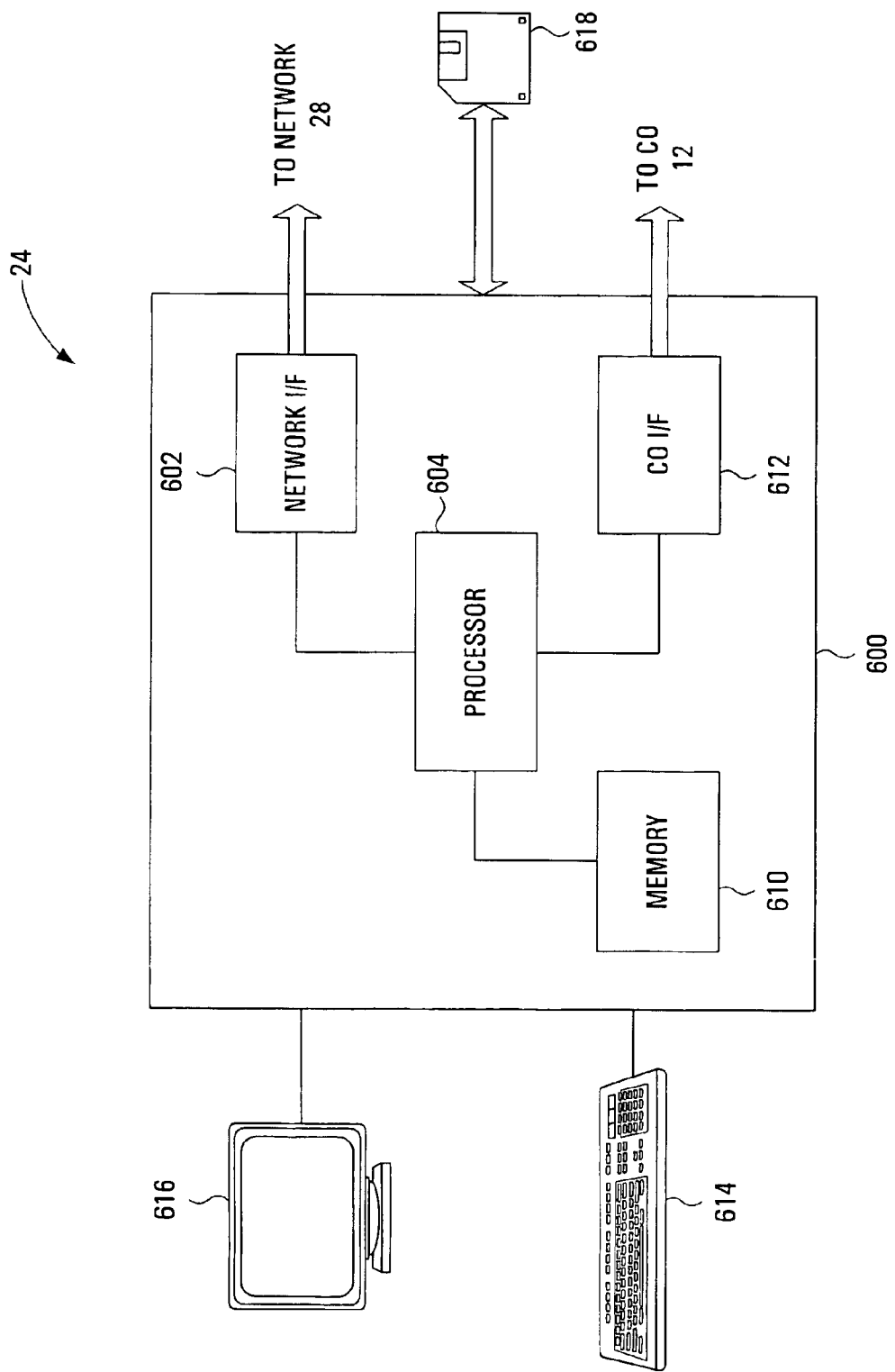
FIG. 2 is a schematic illustration of a portion of FIG. 1.

FIG. 2 is a schematic diagram of web server 24. Web server 24 comprises of a computer server 600 optionally connected to a display 616 and input device 614. Computer server 600 is a networked computer connected to Internet 28. Display 616 can be any type of display known in the art. Similarly input device 514 can be comprised of combinations of common input devices such as keyboards, mice, audio input devices, or other known input devices.

Computer server 600, as is common in the art, is typically a Reduced Instruction Set Computing (RISC) device such as a Sun Microsystems UltraSparc™ Station, or an IBM RS/6000™ computer. However, computer server 600 may also be a PC such as Compaq Proliant™ or IBM NetFinity™ server or any other computer suitable for hosting web pages and connecting to the Internet, either directly or through the PSTN. Computer server 600 is comprised of CPU 604, typically a Sun UltraSparc™ CPU, Motorola or IBM PowerPC™ CPU or Intel Pentium™, Pentium II™, Pentium Pro™ or Pentium III™ CPU; interconnected with memory 610, network interface card 602, and CO Interface 612. Network interface card 602 is connected to Internet 28, and may be an Ethernet, token ring, ATM card, T1 interface or any other suitable means of communication with a data network to support access of a web page by a user. CO Interface 612 can be a plurality or bank of modems connected to CO 12, an ADSL card or similar analog to digital communications device. Memory 610, which is in communication with CPU 604, consists of a combination of volatile and non-volatile memory, typically RAM, ROM and hard disk drive or optical storage device, used to store data, software applications and an operating system. Computer server 600 is also capable of reading computer media 618, which typically is a CD-ROM, diskette or other removable media or a file downloaded from a remote source, sufficient to transfer software or data to computer server 600, generally, and memory 610 specifically.

Figure 3:
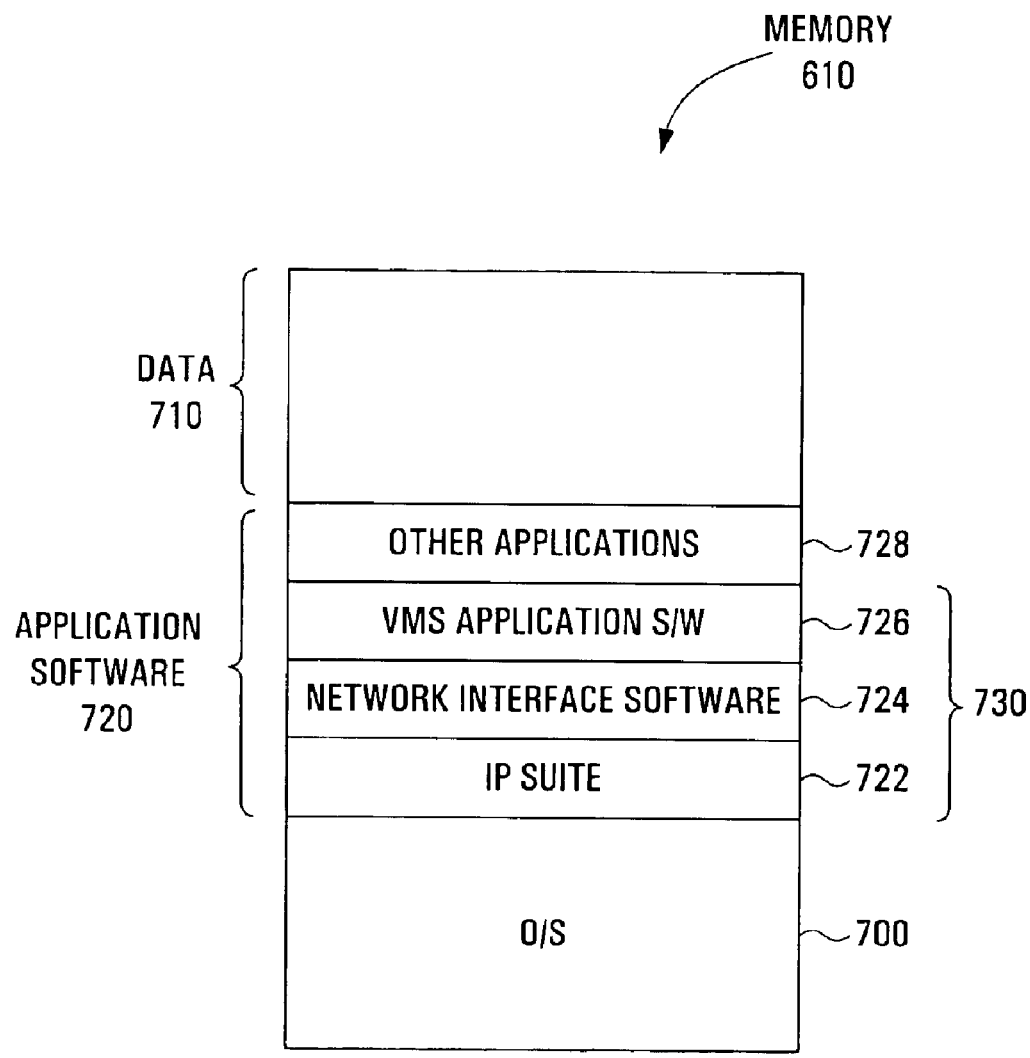
FIG. 3 is a schematic illustration of a portion of FIG. 2.

Referring to FIGS. 2 and 3 memory 610 of computer server 600 is logically divided into three portions, namely operating system 700, application software 720 and data 710. Operating system 700 of computer may be a multitasking operating system such as Unix, Linux, Microsoft Windows NT™, Sun Solaris™ or IBM AIX™. However, any operating system capable of hosting a web site, connecting to the CO, and performing the operations disclosed below is sufficient. Application software 720, stored in memory 610, is further subdivided into CO application software 726, network interface software 724, IP suite 722, and other applications 728. Network interface software 724 enables the operation of network interface 602 and maintains communication between a user, via terminal 30C, and computer server 600 over Internet 28. CO application software 726 enables the operation of CO interface 612 and allows signals to be passed between CO 12 and processor 604. IP Suite software provides the communication protocols, namely the Internet Protocols described in RFC 1011, which is maintained by the Network Working Group of the IETF (Internet Engineering Task Force), the contents of which are hereby incorporated by reference for all purposes, and is designed to facilitate communication between computer server 600 and terminal 30C over data network 24. Together CO application software 726, network interface software 724 and IP Suite 722 comprise communications software 730.

IP suite 722 further includes an HTTP server or daemon; a server resolution application; and, common gateway interface ("CGI") programs.

The HTTP server may, for example, be an Apache Web Server or a Microsoft Internet Information Server application. CGI programs typically interface an HTTP server application with other data and applications at web server 24. CGI programs may be complied or interpreted programs, and may therefore include a suitable interpreter such as Perl interpreter, or the like.

Figure 4:
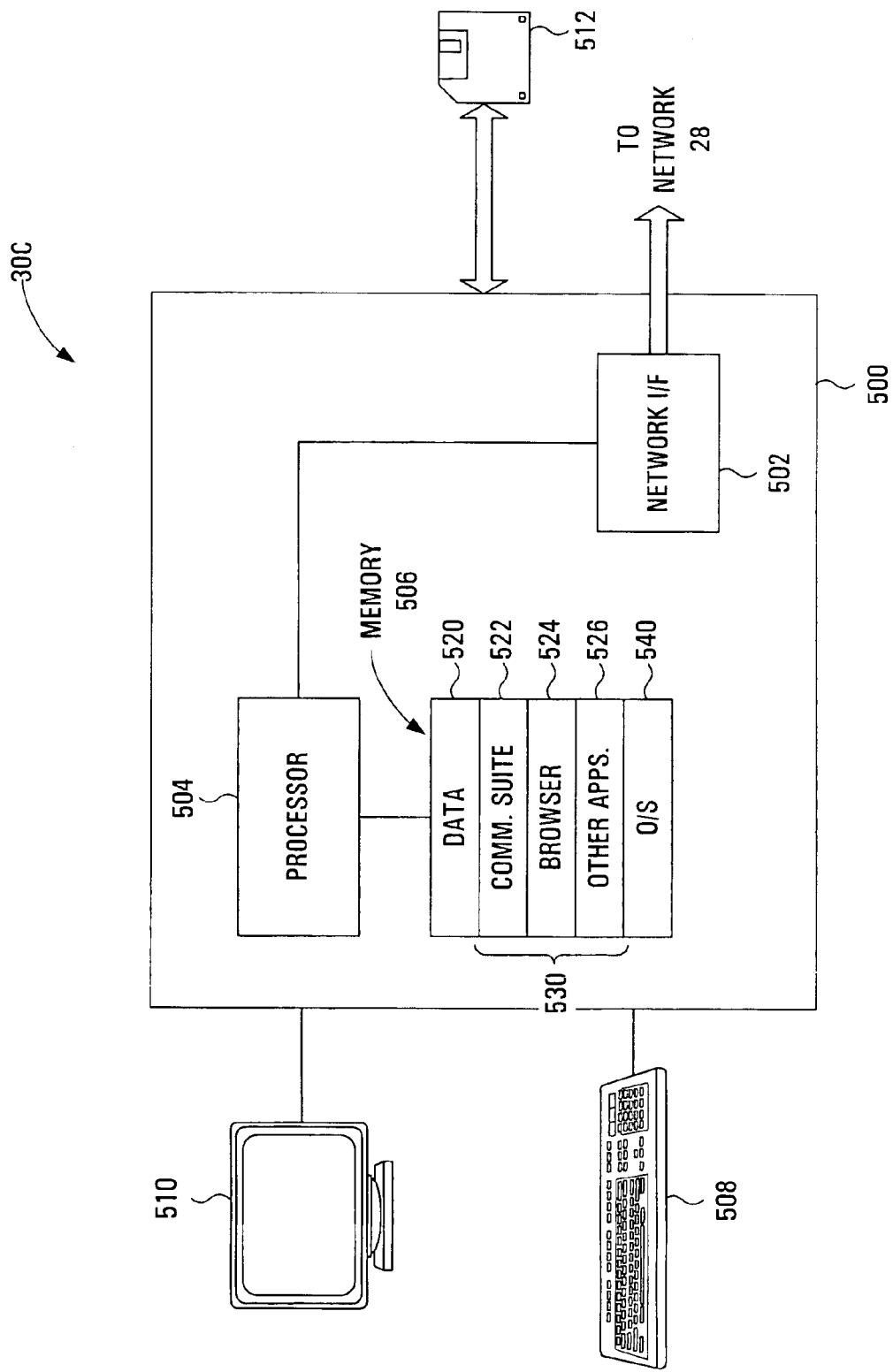
FIG. 4 is a schematic illustration of another portion of FIG. 1.

FIG. 4 is a schematic diagram of data terminal 30C. Data terminal 30C consists of a personal computer (PC) 500 connected to display 510, to input device 508 and to Internet 28. Display 510 can be any type of display known in the art. Similarly input device 508 can be comprised of combinations of common input devices such as keyboards, mice, audio input devices, or other known input devices. PC 500 is comprised of a central processing unit (CPU) 504 interconnected to memory 506 and network interface 502. CPU 504 can be an Intel Pentium™, Motorola PowerPC™ or other suitable processor capable of performing the operations necessary to connect to PC 500 to a network such as the Internet or more specifically to the World Wide Web (WWW). Memory 506 is comprised of volatile memory, including Random Access Memory (RAM), and non-volatile memory, such as a hard disk drive or Read Only Memory (ROM) or preferably a combination of these types of memory. Network interface 502 can be a network interface card such as an Ethernet or Token Ring network card, or a modem that connects to Internet 28 through the PSTN and an Internet Service Provider. PC 500 is also capable of reading computer media 512, which may be a diskette, CD-ROM or other method of transferring data to memory 506 of PC 500. As is known to those skilled in the art, data terminal 30C is not limited to the embodiment described above, but can be modified to come within the spirit and scope of this invention.

Memory 506 contains the software programs and data necessary to enable a terminal 30C to connect and communicate with Internet 28. Memory 506 is comprised of data 520, applications software 530 and operating system 540. Operating system 540 preferably includes a graphical user interface (GUI) such as Microsoft Windows 98™ or the Macintosh Operating System 8™. Application software 530 is comprised of: communications suite 522, which includes means for connecting to Internet 28, and may include TCP/IP, PPP, SLIP, Ethernet or Token Ring software protocols; graphical image browser 524 such as Netscape Navigator™, Microsoft Internet Explorer™, Mosaic™ or other commercially available browsers (including, if desired, text based browsers such as Lynx™); and other applications 526.

Figure 5:
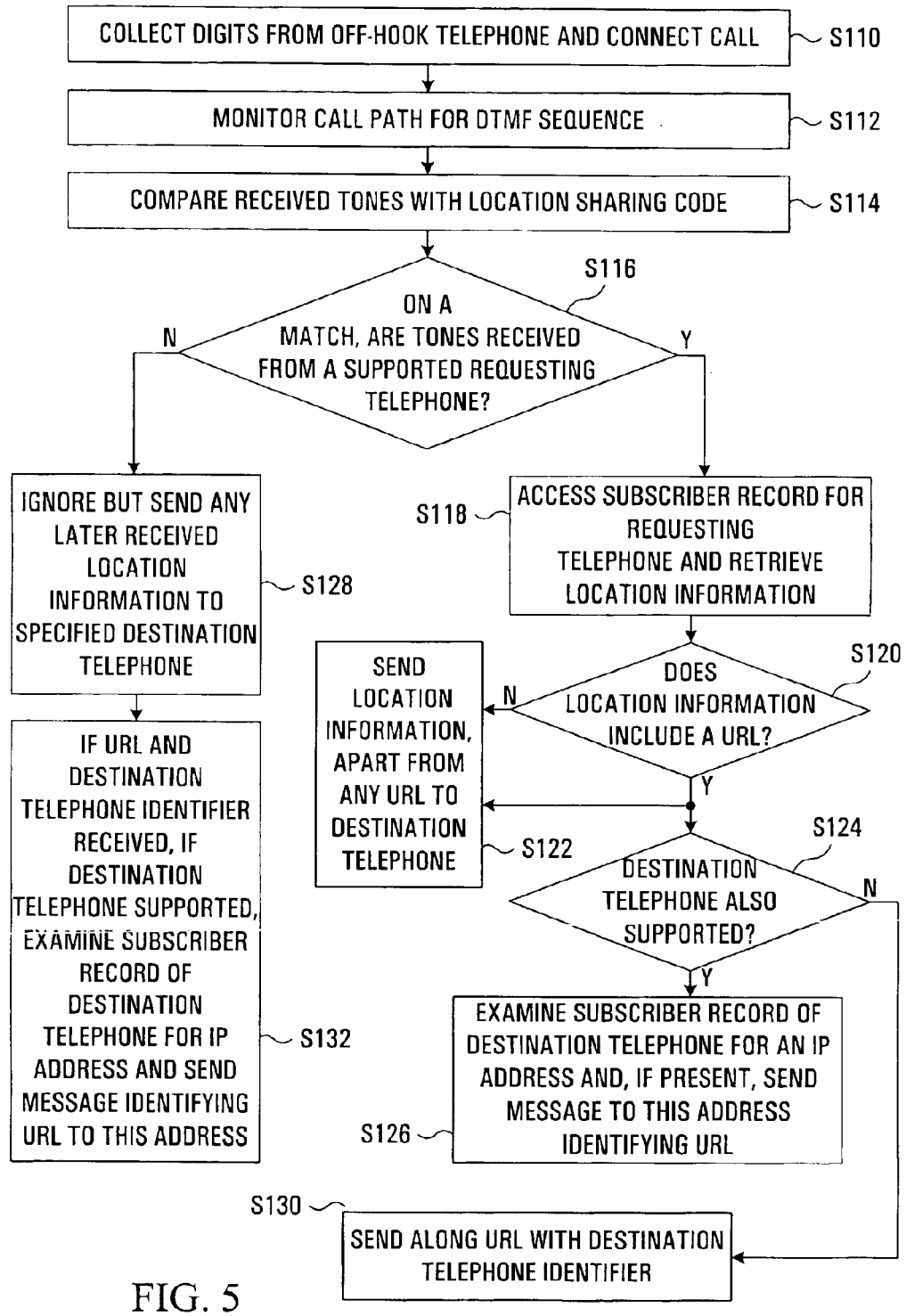
FIG. 5 is a flow diagram illustrating operation of a portion of the system of FIG. 1.

Turning to FIG. 5, which illustrates the operation of CO 12, it may be that telephone 22a goes off-hook and dials the telephone number for telephone 22b. In such instance, processor 34 of CO 12 collects the digits dialled by telephone 22a and establishes a connection through switch 32 to subscriber loop 20b in a conventional fashion (S110). Thereafter, processor 34 monitors the call path for dual tone multi-frequency (DTMF) tones (S112), either continuously or in the state immediately following a switch hook flash. If DTMF tones arrive from either subscriber loop 20a or 20b, the tones are compared with a location information sharing code (S114). If the tones match the code, then if they have arrived from a loop supported by the CO (S116), the CO will have a mapping from the line card terminating the loop to a subscriber record. This mapping may be from a line card identifier to a telephone number, which telephone number is used as an address into the subscriber records portion of database 36; alternatively, the line card identifier itself could be part of the subscriber record and used to address into the database. Assuming the DTMF tones arrived from loop 20a, the CO accesses the subscriber record for loop 20a and retrieves the location information in this record (S118). The CO then determines whether the location information of the subscriber record includes URL data (S120). If no, the CO simply places the location information (comprising subscriber address and, optionally, the nearest intersection) on destination subscriber loop 20b (S122) so that it is provided to telephone 22b.

The CO may send the location information as modem data (frequency shift keying-FSK), in the same way as calling line identification (CLID) data is conventionally sent to a telephone for display. This is described in greater detail in U.S. Pat. No. 5,263,084, the contents of which are incorporated herein by reference.

Alternatively, if CO 12 supports the analog display services interface (ADSI) protocol, the location data may be sent to telephone 22b as ADSI data.

Many telephony subscribers will also have a separate public Internet connection. Thus, there is likely to be a parallel datapath associated with many of the subscriber loops of telephony system 10. This is illustrated in respect of telephone 22c which is associated with data terminal 30c. To take advantage of this, in another embodiment, the location information for subscriber records may include a universal resource locator (URL) for a web site having a map pinpointing the location of the subscriber address. Further, each subscriber record may also indicate an Internet Protocol (IP) address of a data terminal associated with the subscriber. In this embodiment, given a call established between subscriber loop 20a and 20c (S110, S112), after receiving a request on, say, subscriber loop 20a to share location information, CO 12 examines the subscriber record for subscriber loop 20a to determine whether it has a URL (S114, S116, S118, S120). If yes and the destination loop is supported by CO 12 (S124), then CO 12 examines the record for subscriber 20c to determine whether it has an IP address (S126). If the subscriber record for loop 20c does have an IP address, then a message is sent to this address via a common gateway interface (CGI) script running on Web Server 24. If the associated data terminal 30c is on and running server software, then the CGI message may cause the terminal to launch a web browser with a URL specified in the message. This will result in the terminal displaying the map pinpointing the subscriber. In addition, the other location information in the subscriber record for loop 20a may be sent to loop 20c as aforedescribed (S122).

To assist in ensuring privacy for subscribers, the map stored at each URL may have no information to tie it to any particular subscriber.

It may be that telephone 22a dials telephone 22d supported by CO 14. In such case, processor 34 of CO 12 collects the digits dialled and, in a conventional manner, switches the call through to CO 14 on signal path 16. CO 14 completes the call to telephone 22d. Should telephone 22a signal it wishes to share its location with telephone 22d, CO 12, retrieves the location information for subscriber loop 20a and passes this information to CO 14. The information is sent over datapath 18 along with an indication of the destination loop (e.g., with the telephone number associated with loop 20d) (S122). CO 14, operating under the same program control as that of CO 12 (i.e., as shown in FIG. 5), on receiving this location information, places it on loop 20d (S128). Where there is a URL associated with the record for loop 20a, this is also sent to CO 14 (S130) which then examines the record for loop 20d. If loop 20d has a parallel datapath associated with it, the received URL is passed along to a web site (not shown) interfaced to CO 14 via a CGI message (S132) so that a data terminal terminating this datapath may display information at this URL.

Given the ubiquitous nature of the public Internet, the foregoing has assumed that the Internet is the transport for the parallel datapath. However, it will be appreciated that the invention contemplates other data networks and the storing of other data for pinpointing the location of a subscriber which is appropriate for such other networks. For example, in place of storing a URL pointing to a web site storing a map, a subscriber record may store a map file in, for example, PDF format. The subscriber record may also store a datapath address (such as a direct dial-up data number) for connecting to a data terminal associated with a subscriber. In such case, in processing a request for information sharing, a CO may itself, or through a suitable proxy, send a map file in the subscriber record of a subscriber wishing to share his location to the datapath address of the intended recipient.

Telephone 22e is illustrated connected to CO 14 through a wireless communications link 20e. A mobile telephone typically sends its mobile identification number when requesting a call. This mobile identification number may then be used to look up a subscriber record. The subscriber record could simply store the home location of the wireless subscriber. However, the invention has more applications if, either instead of, or in addition to, the home location, the subscriber record stores the current location of the mobile telephony device. For cellular telephony, techniques are being developed for determining the current position of a cell phone by triangulating on the signal from the cell phone using the base stations of adjacent cells. Triangulated location data may be passed back to the home CO on a dynamic basis for updating the appropriate subscriber record. Alternatively, if a cell phone includes a global positioning system (GPS) receiver, the phone could be programmed to pass GPS data back to its borne CO on an ongoing basis. In either event, in these instances, a subscriber using a mobile phone may permit the sharing of either or both of her home location and current location.

Figure 6:
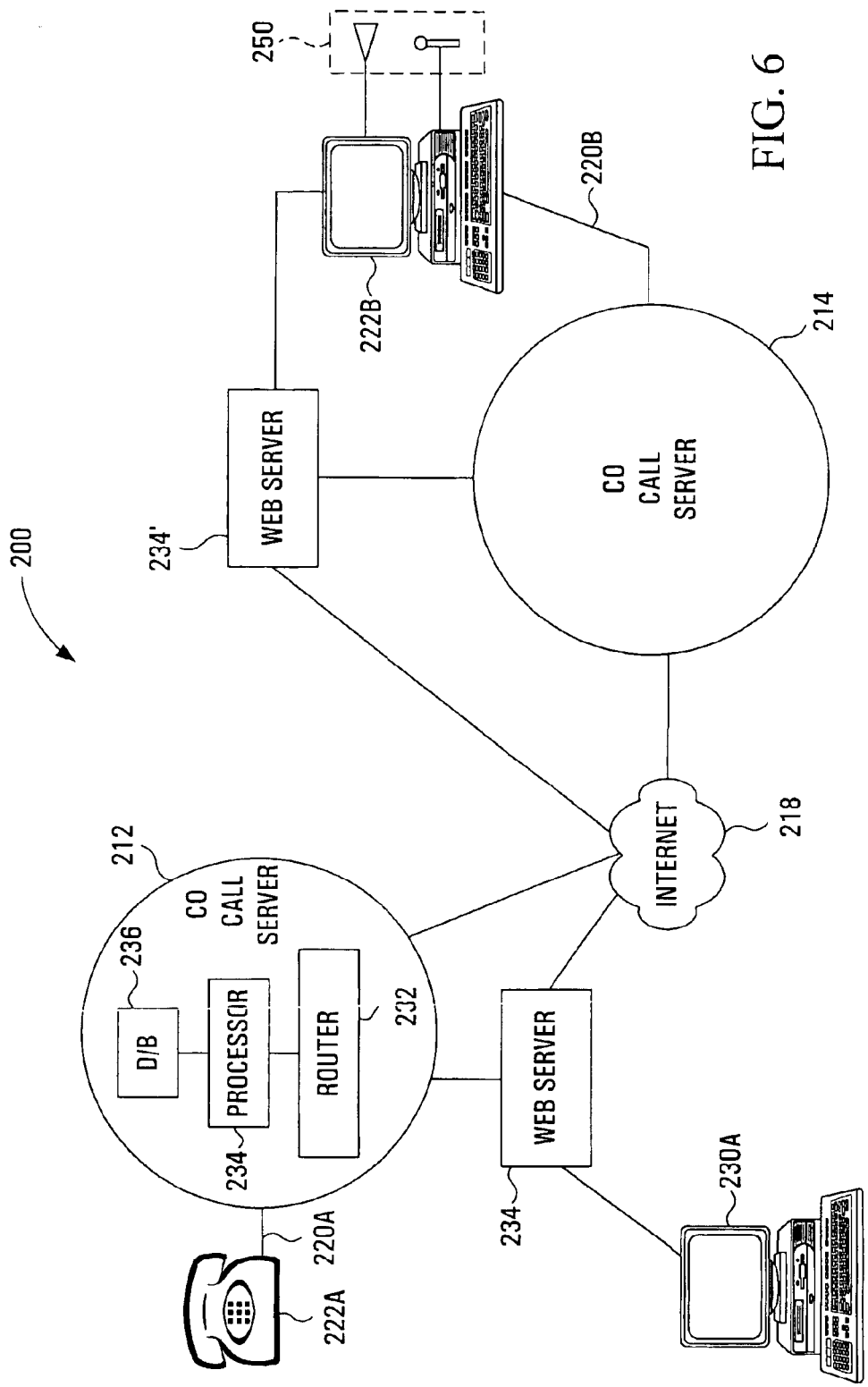
FIG. 6 is a schematic illustration of a telephony system made in accordance with another embodiment of this invention.

Another embodiment of the invention illustrated in FIG. 6 is based upon an Internet Protocol (IP) telephony system. In this embodiment, central office call servers 212, 214 are connected to IP telephony devices 222a, 222b (either directly or through media gateways, dependent upon the system architecture) over communication links 220a, 220b. Each CO call server comprises a router 232, processor 234, and database 236. As illustrated, IP telephony device 22a is an IP telephone and IP telephony device 222b is a data terminal provided with a speaker and microphone user interface 250. The call servers 212, 214 are interconnected over a data network 218, which may be part of the public Internet. Each call server is networked to a web server 234, 234' which, in turn, connects to data terminals 230a, 222b.

The operation of system 200 is the same as that of system 10 of FIG. 1 and is therefore described in FIG. 5. With system 200, however, all communications comprise packetised data sent on data paths. Also, an IP telephone device may do double duty as a data terminal, as illustrated in respect of IP telephone device/data terminal 222b.

While the signalling from a telephone to a CO is indicated to be by way of DTMF tones, any other suitable signaling method may be employed. For example, a special code may be sent by pressing a dedicated key on a telephone.

While the foregoing embodiments have been described in conjunction with telephones, it will be appreciated that the teachings of this invention encompass other communications devices as well, such as pagers.

It will be apparent that many other modifications may be made without departing from the spirit of the invention. Accordingly, the invention is defined in the claims.

What is claimed is:

1. A method for delivering call party location information, comprising:

after connection of a call and during pendency of the call between a first communication device and a second communication device, receiving a location information sharing request from said first communication device;

accessing a database providing location information for a plurality of communication devices and retrieving location information for said first communication device from said database; and forwarding said retrieved location information for said first communications device.

2. The method of claim 1 wherein said forwarding comprises forwarding to said second communications device.

3. The method of claim 2 wherein said location information comprises a street address.

4. The method of claim 2 wherein said forwarding comprises forwarding to a data terminal associated with said second communications device.

5. The method of claim 4 wherein said associated data terminal is associated with said second communications device in a subscriber record for said second comminations device and further comprising accessing said second communications device subscriber record to ascertain said association prior to said forwarding.

6. The method of claim 4 wherein said location information comprises a universal resource locator (URL) forwarded to said data terminal.

7. The method of claim 1 wherein said first communication device is associated with a first identification number, wherein said database provides location information for a plurality of identification numbers and wherein said accessing comprises accessing said database with said first identification number for retrieving location information associated with said first identification number.

8. The method of claim 7 wherein said first identification number is a first telephone number.

9. The method of claim 7 wherein said first identification number is a first mobile identification number.

10. The method of claim 1 wherein said accessing comprising accessing a subscriber records database.

11. The method of claim 1 further comprising:

monitoring a first communications link terminated by said first communications device for said location information sharing request.

12. The method of claim 1 wherein said accessing a database comprises accessing a database of a telephony switch.

13. A method for delivering call party location information, comprising:

after connection of a call and during pendency of the call between a first telephone terminating a first wireline and a second telephone terminating a second wireline, receiving a location information sharing request from said first telephone on said first wireline;

accessing a subscriber records database having records for a plurality of subscribers, each record associating a subscriber with a wireline, and obtaining a record associated with said first wireline, said record comprising location information;

forwarding to said second telephone said location information.

14. A system for delivering call party location information, comprising:

means for, after connection of a call and during pendency of the call between a first communication device and a second communication device, receiving a location information sharing request from said first communication device;

means for accessing a database providing location information for a plurality of communication devices and retrieving location information for said first communication device from said database; and means for forwarding said retrieved location information for said first communications device.

15. A computer readable medium containing instructions which, when performed by a processor of a central office, cause the central office to:

after connection of a call and during pendency of the call between a first telephone and a second telephone, receive a location information sharing request from said first telephone;

access a database providing location information for a plurality of telephones and retrieve location information for said first telephone from said database; and forward said retrieved location information for said first communications device.

16. The computer readable medium of claim 15 which, when performed by said processor, further cause said central office to receive said location information sharing request by:

receiving tones; and comparing said tones with a location sharing code.

17. The computer readable medium of claim 15 which, when performed by said processor, further cause said central office to access said database by:

address said database with a line card identifier terminating a subscriber loop for said first telephone.

18. The computer readable medium of claim 15 which, when performed by said processor, further cause said central office to access said database by:

address said database with an identification number associated with said first telephone.

* * * * *

UNITED STATES PATENT AND TRADEMARK OFFICE
CERTIFICATE OF CORRECTION

PATENT NO. : 6,888,936 B1
DATED : May 3, 2005
INVENTOR(S) : Pieter Groen et al.

It is certified that error appears in the above-identified patent and that said Letters Patent is hereby corrected as shown below:

Title page,
Item [57], ABSTRACT,
Line 2, after "tones" delete "(".

Column 7,
Line 24, delete "comminations" and insert -- communications --.

Signed and Sealed this

Twenty-seventh Day of December, 2005

JON W. DUDAS
*Director of the United States Patent and Trademark Office*